United States Patent
Kwon et al.

(10) Patent No.: US 10,101,874 B2
(45) Date of Patent: Oct. 16, 2018

(54) APPARATUS AND METHOD FOR CONTROLLING USER INTERFACE TO SELECT OBJECT WITHIN IMAGE AND IMAGE INPUT DEVICE

(71) Applicant: Samsung Electronics Co., Ltd., Gyeonggi-do (KR)

(72) Inventors: Dong-Wook Kwon, Gyeonggi-do (KR); Min-Ho Kim, Gyeonggi-do (KR); Kyung-Il Kim, Gyeonggi-do (KR); Gi-Sang Lee, Gyeonggi-do (KR); Sang-Bo Lee, Gyeonggi-do (KR); Jin-Kyung Lee, Gyeonggi-do (KR); Young-Gu Jin, Gyeonggi-do (KR); Jin-Wuk Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 258 days.

(21) Appl. No.: 14/041,888

(22) Filed: Sep. 30, 2013

(65) Prior Publication Data
US 2014/0096084 A1    Apr. 3, 2014

(30) Foreign Application Priority Data
Sep. 28, 2012    (KR) .................. 10-2012-0109435

(51) Int. Cl.
| | | |
|---|---|---|
| G06F 3/0482 | (2013.01) |
| G06F 3/01 | (2006.01) |
| G06F 3/0484 | (2013.01) |
| G06F 3/03 | (2006.01) |
| G06F 3/0481 | (2013.01) |
| G06T 7/70 | (2017.01) |

(52) U.S. Cl.
CPC ............ *G06F 3/0482* (2013.01); *G06F 3/011* (2013.01); *G06F 3/017* (2013.01); *G06F 3/0304* (2013.01); *G06F 3/04815* (2013.01); *G06F 3/04842* (2013.01); *G06F 2203/04101* (2013.01); *G06T 7/70* (2017.01)

(58) Field of Classification Search
CPC ........ G06F 3/017; G06F 3/011; G06F 3/0488; G06F 3/04815; G06F 2203/04101; G06F 2203/04806; G06F 1/1626; G06F 3/0346; G06F 3/0482; G06T 19/006; G06T 11/00; G06T 7/70; G02B 27/01
USPC ........ 715/773, 862, 863; 345/169, 173, 419, 345/633; 463/36
See application file for complete search history.

(56) References Cited

U.S. PATENT DOCUMENTS

| | | | | |
|---|---|---|---|---|
| 7,671,916 B2* | 3/2010 | Hashimoto | ............... | 348/333.01 |
| 8,232,990 B2* | 7/2012 | King et al. | .................... | 345/419 |
| 8,237,666 B2* | 8/2012 | Soo et al. | ..................... | 345/173 |

(Continued)

FOREIGN PATENT DOCUMENTS

KR    1020120020045    3/2012

*Primary Examiner* — Andrew L Tank
(74) *Attorney, Agent, or Firm* — The Farrell Law Firm, P.C.

(57) ABSTRACT

A method for controlling a user interface of an apparatus to enable intuitive manipulation for an object included in an image is provided. An object with deeper depth in a rear image of the apparatus may become selectable when the user holds a user input means close to the apparatus, while an object with shallower depth in the rear image may become selectable when the user draws the user input means away from the apparatus, thereby allowing the user to intuitively select an object in the rear image.

12 Claims, 8 Drawing Sheets

(56) References Cited

U.S. PATENT DOCUMENTS

| | | | |
|---|---|---|---|
| 8,373,666 B2* | 2/2013 | Jung | 345/173 |
| 8,384,665 B1* | 2/2013 | Powers et al. | 345/156 |
| 8,384,718 B2* | 2/2013 | Dahlke | 345/467 |
| 8,681,179 B2* | 3/2014 | Rolleston et al. | 345/633 |
| 8,884,988 B1* | 11/2014 | Cho et al. | 345/633 |
| 8,952,983 B2* | 2/2015 | Uusitalo et al. | 345/629 |
| 8,954,896 B2* | 2/2015 | Frazier et al. | 715/863 |
| 9,041,622 B2* | 5/2015 | McCulloch et al. | 345/7 |
| 9,377,866 B1* | 6/2016 | Schiewe | G06F 3/017 |
| 9,513,710 B2* | 12/2016 | Lee | G06F 3/017 |
| 2008/0071559 A1* | 3/2008 | Arrasvuori | 705/1 |
| 2009/0303204 A1* | 12/2009 | Nasiri et al. | 345/184 |
| 2010/0253766 A1* | 10/2010 | Mann et al. | 348/51 |
| 2010/0315413 A1* | 12/2010 | Izadi et al. | 345/419 |
| 2011/0093778 A1* | 4/2011 | Kim et al. | 715/702 |
| 2011/0214082 A1* | 9/2011 | Osterhout et al. | 715/773 |
| 2011/0242134 A1* | 10/2011 | Miller et al. | 345/633 |
| 2011/0319138 A1* | 12/2011 | Noh | 455/566 |
| 2012/0019557 A1* | 1/2012 | Aronsson | G06T 11/00 345/633 |
| 2012/0075433 A1* | 3/2012 | Tatzgern et al. | 348/50 |
| 2012/0154293 A1* | 6/2012 | Hinckley et al. | 345/173 |
| 2012/0182396 A1* | 7/2012 | Hu | G06F 3/0346 348/47 |
| 2012/0194432 A1* | 8/2012 | Deluca | 345/158 |
| 2012/0202569 A1* | 8/2012 | Maizels | G06F 3/017 463/3 |
| 2012/0224060 A1* | 9/2012 | Gurevich | B60R 1/00 348/148 |
| 2013/0009891 A1* | 1/2013 | Watanabe | G06F 3/0488 345/173 |
| 2013/0033483 A1* | 2/2013 | Im | G06F 3/0482 345/419 |
| 2013/0050258 A1* | 2/2013 | Liu | G06F 3/005 345/633 |
| 2013/0147837 A1* | 6/2013 | Stroila | 345/633 |
| 2013/0265276 A1* | 10/2013 | Obeidat et al. | 345/174 |
| 2013/0278631 A1* | 10/2013 | Border et al. | 345/633 |
| 2013/0303247 A1* | 11/2013 | Wu et al. | 463/5 |
| 2014/0267142 A1* | 9/2014 | MacDougall | G06F 3/017 345/174 |

* cited by examiner

APPARATUS AND METHOD FOR CONTROLLING USER INTERFACE TO SELECT OBJECT WITHIN IMAGE AND IMAGE INPUT DEVICE

PRIORITY

This application claims priority under 35 U.S.C. § 119(a) to a Korean Patent Application filed in the Korean Intellectual Property Office on Sep. 28, 2012, and assigned Serial No. 10-2012-0109435, the contents of which are incorporated herein by reference.

BACKGROUND OF THE INVENTION

1. Field of the Invention

The present invention relates generally to an apparatus and method for controlling a user interface, and more particularly, to an apparatus and method for controlling a user interface to allow a user to easily select an object within an image.

2. Description of the Related Art

Along with the recent rapid growth of communication technologies, functionality of electronic devices has gradually expanded, also resulting in the emergence of various User Interfaces (UIs) and functions. The electronic device also employs many different input systems to control the functions.

Intuitive interface technologies, such as Natural User Interfaces (NUIs) with natural and enhanced interaction functions between humans and computers are emerging. Studies have increased on recognition of user intentions and behaviors, and sectors such as interactive displays that may replace typical user interfaces, such as keyboards and mice and provide more natural computing environments.

Conventional interactive displays provide a method of manipulating UIs with multi-touches and hovering events on the display surface. Mice and keyboards provide indirect interaction, such that the user's gaze is not directed toward the manipulation space. In contrast, multi-touches and hovering events provide direct interaction such that the user's gaze is directed toward the manipulation space, thus enabling more natural manipulation. Multi-touches, however, are only available on the display surface (a Two Dimensional method) and thus, intuitive manipulation that allows the user to manipulate a Three Dimensional (3D) target object as if he/she is manipulating a real object is impossible with such multi-touches. In the case of hovering that creates hand information, immersive and integrated object manipulation may not be provided.

As described above, electronic devices have thus far been controlled by making direct inputs to particular input means to control the electronic device. Therefore, where augmented reality information that has been pre-established based on real-time processing is presented while overlapping with an image observed in reality (a real image), additional information about an object in the real image may be viewed but not manipulated by a user. Thus, a need exists for a method for enabling easy interaction for an object in a real image to allow a user to intuitively manipulate the object.

SUMMARY OF THE INVENTION

The present invention provides an apparatus and method for controlling a user interface to allow a user to easily select an object included in an image.

The present invention also provides an apparatus and method for controlling a user interface to enable intuitive manipulation for an object included in an image.

In accordance with an aspect of the present invention, provided is an apparatus configured to control a user interface to select an object included in an image, the apparatus including a first image input unit configured to output a first image obtained by capturing a user input means, a second image input unit placed on an opposite side of the first image input unit configured to output a second image obtained by capturing what is ahead, a display unit configured to display the second image, and a controller configured to control to recognize multiple objects within the second image, and to display the second image by changing a selectable object among the multiple objects based on a distance between the user input means and the display unit.

In accordance with another aspect of the present invention, provided is an image input apparatus configured to output an image that contains multiple objects, the image input apparatus including a first image input unit configured to output a first image obtained by capturing a user input means and providing depth information about the first image that represents a distance between the user input means and the image input apparatus, and a second image input unit arranged on an opposite side of the first image input unit configured to output a second image that includes multiple objects having different depths, such that the multiple objects become selectable sequentially from an object with shallow depth to an object with deeper depth as the distance decreases.

In accordance with another aspect of the present invention, provided is a method for selecting an object included in an image in an apparatus configured to control a user interface, the method including recognizing and displaying multiple objects within a first image obtained by capturing what is ahead, measuring a distance between a user input means and the apparatus based on a second image obtained by capturing the user input means, and changing and displaying a selectable object among the multiple objects based on the measured distance.

BRIEF DESCRIPTION OF THE DRAWINGS

The above and other aspects, features, and advantages of certain embodiments of the present invention will be more apparent from the following description taken in conjunction with the accompanying drawings in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides a method for controlling a user interface to enable intuitive manipulation for an object included in an image. To do this, the method includes receiving a first image of a user input means through a first image input unit equipped in an apparatus for controlling the user interface, receiving a second image through a second image input unit equipped in the apparatus, the second image input unit being placed on the other side of the first image input unit, measuring a distance to the user input means based on the first image, and displaying the second image by sequentially changing selectable objects from an object with less depth to an object with more depth as the distance decreases. An object with more depth in a rear image may become selectable when the user holds the user input means close to the apparatus, while an object with less depth in the rear image may become selectable when the user moves the user input means away from the apparatus, thereby allowing the user to intuitively select an object in the image.

Figure 1:
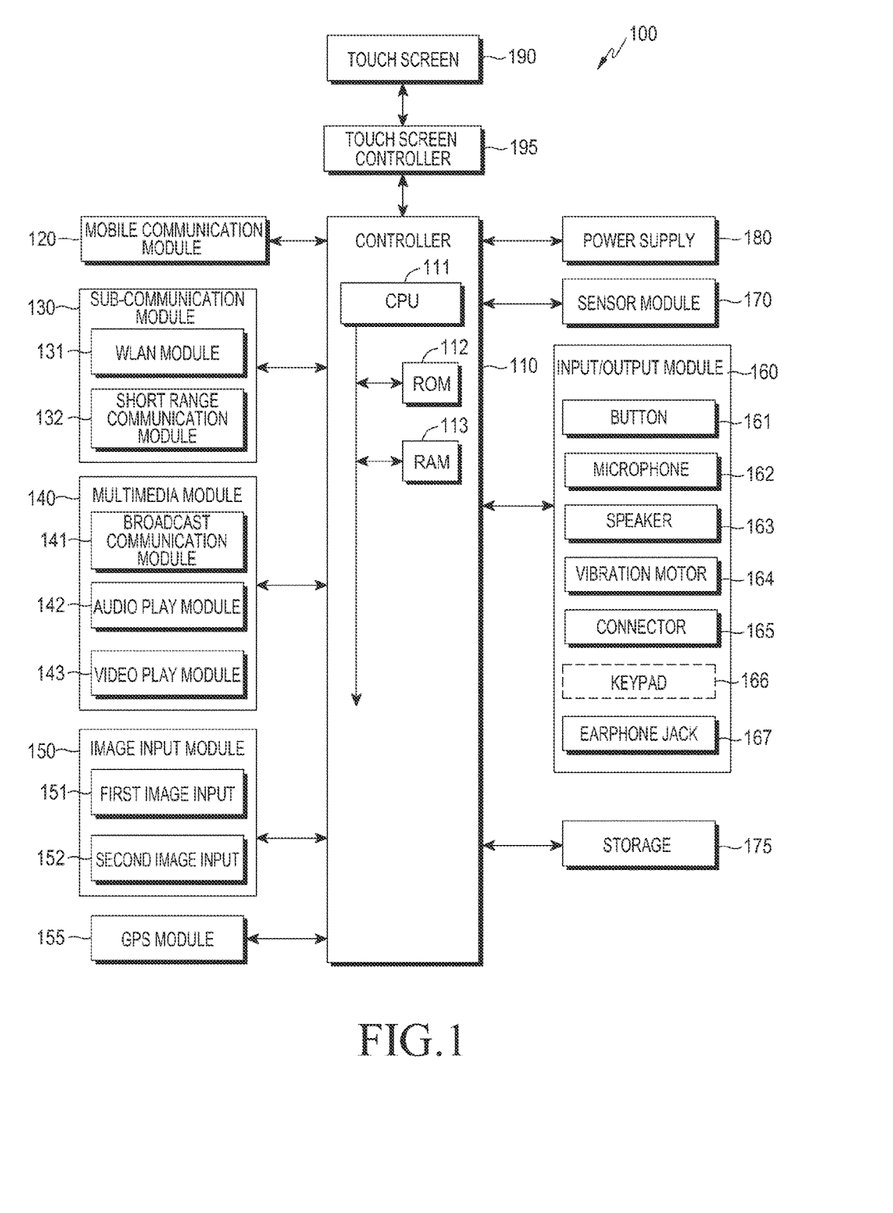
FIG. 1 is a block diagram of an apparatus for controlling a user interface, according to an embodiment of the present invention.

FIG. 1 is a block diagram of an apparatus for controlling a user interface, according to an embodiment of the present invention. Although the apparatus is illustrated as a mobile terminal in the embodiment of FIG. 1, a cell phone, a smartphone, a tablet Personal Computer (tablet PC), a game console, or any other device that may recognize and use a user input means to get input commands may be the apparatus. For convenience of explanation herein, the apparatus is assumed to be a mobile terminal.

Referring to FIG. 1, a mobile terminal 100 may be connected to an external device (not shown) via a mobile communication module 120, a sub-communication module 130, and a connector 165. The external device includes other devices, cell phones, smartphones, tablet PCs, and servers.

The mobile terminal 100, includes a display unit and a display controller. The display unit may be implemented as a Liquid Crystal Display (LCD) panel, and when the LCD panel is a form of a touch screen, the display unit serves as an input means as well. In this embodiment, the display unit and the display controller are illustrated as a touch screen 190 and a touch screen controller 195, respectively.

The mobile terminal 100 also includes a controller 110, a mobile communication module 120, a sub-communication module 130, a multimedia module 140, an image input module 150, an input/output module 160, a sensor module 170, a storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and a video play module 143. The input/output module 160 may include at least one of a button 161, a microphone 162, a speaker 163, a vibrating motor 164, a connector 165, a keypad 166 and an earphone jack 167.

The controller 110 may control the mobile communication module 120, the sub-communication module 130, the multimedia module 140, the input/output module 160, the sensor module 170, the storage 175, the power supply 180, the touch screen 190, and the touch screen controller 195.

The controller 110 configured with a Central Processing Unit (CPU), for example, controls to display a rear image photographed by a second image input unit 152 facing a direction in which a user views an object, recognize multiple objects within the rear image, measure a distance between a user input means and the mobile terminal 100 based on a front image obtained by photographing the user input means by a first image input unit 151 facing a user, and display the image of what is ahead by changing a selectable object among the multiple objects according to the measured distance. In other words, the controller 110 controls to display the image by changing selectable objects sequentially from an object with shallower depth to an object with deeper depth among the multiple objects as the distance between the user input means and the mobile terminal 100 decreases. The controller 110 also controls to display the image by changing selectable objects sequentially from an object with deeper depth to an object with shallower depth among the multiple objects as the distance between the user input means and the mobile terminal 100 increases.

As such, the controller 110 performs an operation of ensuring that an object for which the position corresponds to the depth information of the user input means become selectable as the user input means moves toward/from the touch screen 190 by matching the depth information of the user input means with respective depth information of the multiple objects ahead. As the user input means comes closer to the touch screen 190, selectable objects change sequentially from an object with shallower depth to an object with deeper depth without actually touching them, thus giving an effect as if the user input means actually contacts the objects sequentially.

Then, if an object is selected, the controller 110 may perform searching, zooming in/out, or the like on the selected object. Such an operation of determining a selectable object among multiple objects based on a distance to the user input means will be described in detail later herein.

The mobile communication module 120 connects the mobile terminal 100 to an external device through mobile communication using at least one-one or more-antennas (not shown) under control of the controller 110. The mobile communication module 120 transmits/receives wireless signals for voice calls, video conference calls, Short Message Service (SMS) messages, or Multimedia Message Service (MMS) messages to/from a cell phone, a smart phone, a tablet PC, or another device, the phones having phone numbers to be entered into the mobile terminal 100.

The sub-communication module 130 may include at least one of the WLAN module 131 and the short-range communication module 132. For example, the sub-communication module 130 may include either or both of the WLAN module 131 or the-short-range communication module 132.

The WLAN module 131 may be connected to the Internet in a place where there is an Access Point (AP) (not shown), under control of the controller 110. The WLAN module 131 supports Institute of Electrical and Electronic Engineers' (IEEE's) WLAN standard IEEE802.11x. The short-range communication module 132 may conduct short-range communication between the mobile terminal 100 and an image rendering device (not shown) under control of the controller 110. The short-range communication may include Bluetooth®, Infrared Data Association (IrDA), WiFi-Direct, and Near Field Communication (NFC), for example.

The mobile terminal 100 may include at least one of the mobile communication module 120, the WLAN module 131 and the short-range communication module 132 depending on the performance. For example, the mobile terminal 100 may include a combination of the mobile communication module 120, the WLAN module 131 and the short-range communication module 132 depending on the performance.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown) under control of the controller 110. The audio play module 142 may play digital audio files (e.g., files having extensions, such as mp3, wma, ogg, or way) stored or received under control of the controller 110. For example, where a media object is selected, the audio play module 142 play songs that correspond to the selected media object. The video play module 143 may play digital video files (e.g., files having extensions, such as mpeg, mpg, mp4, avi, move, or mkv) or digital audio files stored or received under control of the controller 110.

The multimedia module 140 may include the audio play module 142 and the video play module 143 except for the broadcast communication module 141. The audio play module 142 or video play module 143 of the multimedia module 140 may be incorporated in the controller 100.

Figure 3:
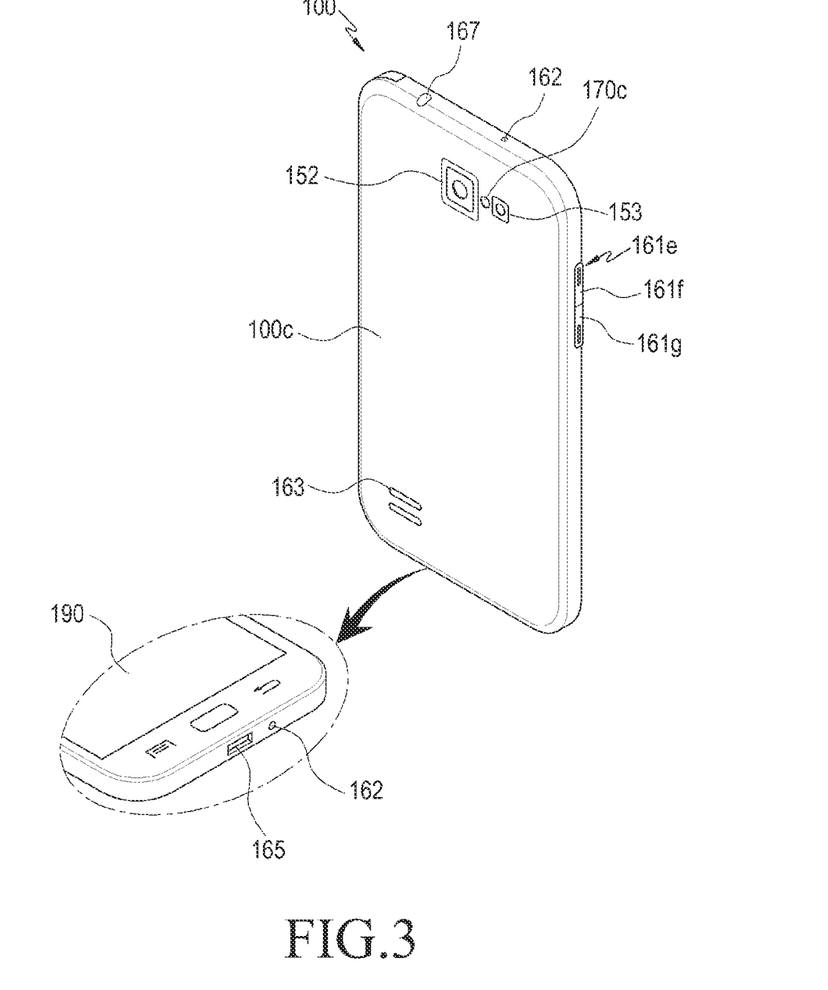
FIG. 3 is a rear view of an apparatus for controlling a user interface, according to an embodiment of the present invention.

The image input module 150 may include at least one of the first and second image input units 151 and 152 for capturing still images or video images under control of the controller 110. Furthermore, the first or second image input units 151 or 152 may include an auxiliary light source (e.g., flash 153, FIG. 3) configured to provide light as much as required for capturing. The first image input unit 151 may be placed on the front of the mobile terminal 100 and the second image input 152 may be placed on the back 100c of the mobile terminal 100, as shown in FIG. 3. The image input module 150 is equipped in the mobile terminal 100, and any devices equipped with such an image input module may also apply embodiments of the present invention.

The first image input unit 151 placed on the front of the mobile terminal 100 outputs a first image obtained by capturing a user input means, such as the user's hand or a stylus pen. The controller 110 may create information about the user input means based on the first image. For example, the controller 110 may create information about movement of the user's hand. The information about the user input means may include a moving path of the user input means, such as information about whether the user input means is moving toward or away from the touch screen 190 of the mobile terminal 100, information about whether two fingers are pinched in or out, and information about whether an object is selected with a finger.

The second image input unit 152 placed on an opposite side of the first image input unit 151, i.e., from the rear of the mobile terminal 100, outputs a second image obtained by capturing what is ahead of the second image input unit 152. Specifically, the second image input unit 152 may include a depth sensor that recognizes the multiple objects within the second image and provides respective depth information of the multiple objects. The first image input unit 151 may include a depth sensor configured to provide depth information that represents a distance to the user input means. As such, the first and second image input units 151 and 152 may each obtain depth images that contain respective depth information of one or more objects. The mobile terminal 100 may use a Time-of-Flight (TOF) based depth sensor to obtain a physical distance from the mobile terminal 100 to an object, i.e., depth information. It is understood that any other technologies than the TOF-based technology may also be used to measure and/or compute the depth information in other embodiments.

According to the present invention, the first image input unit 151 may be referred to as a front camera, the second image input unit 152 may be referred to as a rear camera, the first image may be referred to as a front image, and the second image may be referred to as a rear image.

Each of the first and second image input unit 151 and 152 may incorporate or may be separated from the depth sensor. In any case, the controller 110 may determine a sense of perspective using the depth information provided by the depth sensor. Alternatively, the controller 110 may obtain a physical distance from the mobile terminal 100 to an object using an algorithm to obtain the depth information.

The image input module 150 may optionally further include a third image input unit (not shown). In this case, the first image input unit 151 and the third image input unit placed adjacent to each other (within a range between 1 Cm and 8 Cm) may capture 3D still or video images. If a 3D still image is captured, the controller 110 recognizes multiple objects within the 3D still image, and then may display the 3D still image by using an indicator that indicates which object is selectable based on a measured distance to the user input means. An algorithm to detect objects may be a common recognition algorithm, such as a face or hand recognition algorithm for humans and a template-based matching algorithm for other objects.

With the 3D image with multiple objects displayed according to the algorithm, the user may select any of the multiple objects more intuitively and obtain a sense of perspective about the selected object.

A Global Positioning System (GPS) module 155 receives radio signals from a plurality of GPS satellites (not shown)

in Earth's orbit, and may calculate the position of the mobile terminal 100 by using time of arrival from the GPS satellites to the mobile terminal 100.

The input/output module 160 may include at least one of buttons 161, the microphone 162, the speaker 163, the vibrating motor 164, the connector 165, the keypad 166 and the earphone jack 167.

Figure 2:
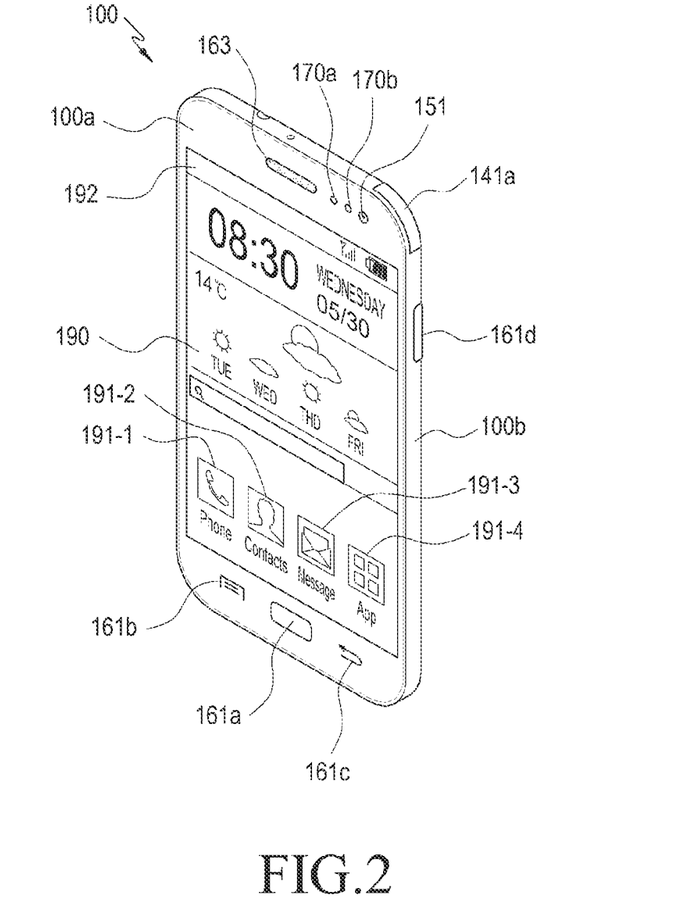
FIG. 2 is a front view of an apparatus for controlling a user interface, according to an embodiment of the present invention.

The button 161 may be formed on the front, side, or rear of a housing of the mobile terminal 100, and may include at least one of home button 161a, menu button 161b, back button 161c, volume buttons 161e, 161f, and 161g, and power/lock button, as shown in FIGS. 2-3.

The microphone 162 generates electric signals from voice or sound received, under control of the controller 110.

The speaker 163 may output sounds corresponding to various signals (e.g., radio signals, broadcast signals, digital audio files, digital video files or photography signals) from the mobile communication module 120, sub-communication module 130, or multimedia module 140 to the outside of the mobile terminal 100 under control of the controller 110. The speaker 163 may output sounds (e.g., button-press sounds or ringback tones) that correspond to functions performed by the mobile terminal 100. There may be one or multiple speakers 163 arranged in a proper position or positions of the housing of the mobile terminal 100.

The vibration motor 164 may convert an electric signal to a mechanical vibration under control of the controller 110. For example, the mobile terminal 100 in a vibrating mode operates the vibrating motor 164 when receiving a voice call from another device (not shown). There may be one or more vibration motors 164 inside the housing of the mobile terminal 100. The vibration motor 164 may operate in response to a touch activity or successive touches by a user on the touchscreen 190.

The connector 165 may be used as an interface for connecting the mobile terminal 100 to the external device (not shown) or a power source (not shown). Under control of the controller 110, data stored in the storage 175 of the mobile terminal 100 may be transmitted to the external device via a cable connected to the connector 165, or data may be received from the external device. Power may be supplied from the power source via a cable connected to the connector 165 or a battery (not shown) may be charged.

The keypad 166 may receive key inputs from the user to control the mobile terminal 100. The keypad 166 includes a mechanical keypad (not shown) formed in the mobile terminal 100, or a virtual keypad (not shown) displayed on the touchscreen 190. The mechanical keypad formed in the terminal device 100 may be excluded depending on the performance or structure of the mobile terminal 100.

The sensor module 170 includes at least one sensor for detecting a status of the mobile terminal 100. For example, the sensor module 170 may include a proximity sensor for detecting whether a user is approaching the mobile terminal 100, a geomagnetic sensor for detecting the tilt of the mobile terminal 100, and a motion sensor for detecting the motion of the mobile terminal 100. At least one sensor may detect the status and generate a corresponding signal to transmit to the controller 110. A sensor may be added to or removed from the sensor module 170 depending on the performance of the mobile terminal 100. In an embodiment, the sensor module 170 may include a depth sensor to obtain depth information that represents a physical distance to an object ahead or to the user input means.

The storage 175 may store signals or data input/output according to operations of the mobile communication module 120, the sub-communication module 130, the multimedia module 140, the input/output module 160, the sensor module 170, and the touchscreen 190 under control of the controller 110. The storage 175 may store control programs and applications for controlling the mobile terminal 100 or the controller 110.

The term "storage" refers to not only the storage 175, but also Read Only Memories (ROMs), Random Access Memories (RAMs) in the controller 110, or a memory card (not shown) (e.g., a Secure Digital (SD) card, or a memory stick) installed in the mobile terminal 100. The storage may also include a non-volatile memory, volatile memory, Hard Disc Drive (HDD), or Solid State Drive (SSD).

The power supply 180 may supply power to one or more batteries (not shown) placed inside the housing of the mobile terminal 100, under control of the controller 110. The one or more batteries power the mobile terminal 100. The power supply 180 may supply the mobile terminal 100 with the power input from the external power source (not shown) via a cable connected to the connector 165.

The touchscreen 190 may provide the user with a user interface for various services (e.g., call, data transmission, broadcasting, photography services). The touchscreen 190 may send an analog signal corresponding to at least one touch input to the user interface to the touchscreen controller 195. The touch screen 190 may receive at least one input through the user's physical contact, such as with a finger or thumb, a touchable input device such as a stylus pen, or pressure. The touch screen 190 may also receive consecutive touch movements, i.e., a pattern of touches. The touch screen 190 may send an analog signal corresponding to the consecutive moves of the input touch to the touchscreen controller 195. The touch screen 190 may be implemented in a resistive, capacitive, infrared, acoustic wave, pressure-type, or Electro-Magnetic Resonance (EMR) manner, for example.

The touch screen 190 displays an image ahead, which is captured by the second image input unit 152. When multiple objects are recognized through an image recognition algorithm for the image ahead, indicators for the recognized multiple objects may also be displayed on the touch screen 190. For example, indicators are to identify the recognized multiple objects by highlighting outlines of the objects.

As the user brings the user input means close to the touch screen 190 of the mobile terminal 100, color or shading of an outline of a selectable object among the multiple objects may be changed. That is, the user may identify which object is now selectable when one of indicators assigned to the multiple objects is changed. Alternatively, a form of a check box may be used as the indicator, and a selectable object may be indicated by a checked box. There may be only a single indicator and the indicator may move from an object to another to indicate which object is selectable as the distance between the mobile terminal 100 and the user input means changes. When any selectable object is selected, further information about the object may be searched and displayed with the object, or the object may be displayed in an expanded or reduced manner.

The touch screen controller 195 converts the analog signal received from the touch screen 190 to a digital signal (e.g., XY coordinates) and transmits the digital signal to the controller 110. Thus, the controller 110 may receive from the touch screen controller 195 an output value of touch displacement from an original touch position to the current touch position. The output value is a digital signal in XY coordinates, and the controller 110 may control the touch screen 190 by using the digital signal received from the touch screen controller 195.

For example, in response to the touch event or the hovering event, the controller 110 may enable a shortcut icon (not shown) displayed on the touch screen 190 to be selected or to be executed. The touch screen controller 195 may also be incorporated in the controller 110, and may determine the distance between where the hovering event occurs and the touch screen 190 by detecting a value (e.g., a current value) output through the touch screen 190, convert the determined distance to a digital signal (e.g., in Z coordinate), and provide the digital signal to the controller 110.

The touch screen 190 may include at least two touch screen panels for detecting touches or proximity of the user's body or the touchable input means to receive both inputs of the user's body or the touchable input means simultaneously. The at least two touchscreen panels provide different output values to the touch screen controller 195, which may differentiate inputs made by the user's body and inputs made by the touchable input means through the touch screen 190 by differently recognizing the values input from the at least two touch screen panels. For example, the touch screen 190 may have a combination of capacitive touch screen panel and ElectroMagnetic Radiation (EMR) touch screen panel.

FIG. 2 is a front view of a mobile device, according to an embodiment of the present invention. FIG. 3 is a rear view of a mobile device, according to an embodiment of the present invention.

Referring to FIG. 2, the front face 100a of the mobile device 100 has the touch screen 190 arranged in the center. The touch screen 190 is formed as large as it may occupy most of the front face 100a of the mobile device 100. In FIG. 2, the touch screen 190 shows an example of displaying a main home screen. The main home screen is a first screen to be displayed on the touch screen 190 when the mobile device 100 is powered on. When the mobile device 100 has multiple pages of different home screens, the main home screen may be the first of the home screens. In the main home screen, shortcut icons 191-1, 191-2, 191-3 for running frequently-used applications, a main menu key 191-4, time, weather, etc. may be displayed. If selected, the main menu key 191-4 displays a menu screen on the touchscreen 190. In an upper part of the touchscreen 190, there may be a status bar 192 to display statuses of the mobile device 100, such as a battery charging state, intensity of received signals, and current time.

There may be a home button 161a, a menu button 161b, and a back button 161c arranged on a lower part of the touch screen 190.

When selected, the home button 161a displays the main home screen on the touch screen 190. For example, if the home button 161a is touched while any home screen other than the main home screen or a menu screen is displayed in the touch screen 190, the main home screen may be displayed on the touch screen 190. Furthermore, if the home button 161a is touched while applications are running on the touch screen 190, the main home screen shown in FIG. 2 may be displayed on the touch screen 190. The home button 161a may also be used to display recently used applications or a task manager on the touch screen 190.

The menu button 161b provides a link menu that may be used on the touch screen 190. The link menu may include a widget addition, background change, search, edit, and environment-setting menu, for example.

The back button 161c, when touched, may display a screen that was displayed right before a current screen or stop a most recently used application.

On the edge of the front face 100a of the mobile device 100, the first image input unit 151, a depth sensor 170a, and the proximity sensor 170b may be placed. On the back 100c of the mobile device 100, the second image input unit 152, the flash 153, a depth sensor 170c and the speaker 163 may be placed, as shown in FIG. 3. The depth sensor 170a in the front outputs depth information of an object, i.e., a user input means such as, the user's hand, a hand gesture, and a stylus pen, in the image obtained by capturing the user input means. The depth sensor 170c on the rear of the device outputs respective depth information of objects in an image obtained by capturing objects ahead. Accordingly, the depth sensors 170a and 170c may help obtain respective depth values that represent a sense of perspective about objects included in an image.

On the side 100b of the mobile device 100, e.g., a power/reset button 161d, a volume button 161e that consists of a volume up button 161f and a volume down button 1161g, a terrestrial Digital Multimedia Broadcast (DMB) antenna 141a for broadcast reception, one or more microphones 162, may be placed. The DMB antenna 141a may be fixed to the mobile device 100, or be removably arranged. On the lower side of the mobile device 100, the connector 165 is formed. The connector 165 has a number of electrodes and may be connected to an external apparatus via a cable. On the upper side of the mobile device 100, the headset jack 167 may be formed. The headset jack 167 may have a headset inserted thereto.

Figure 4:
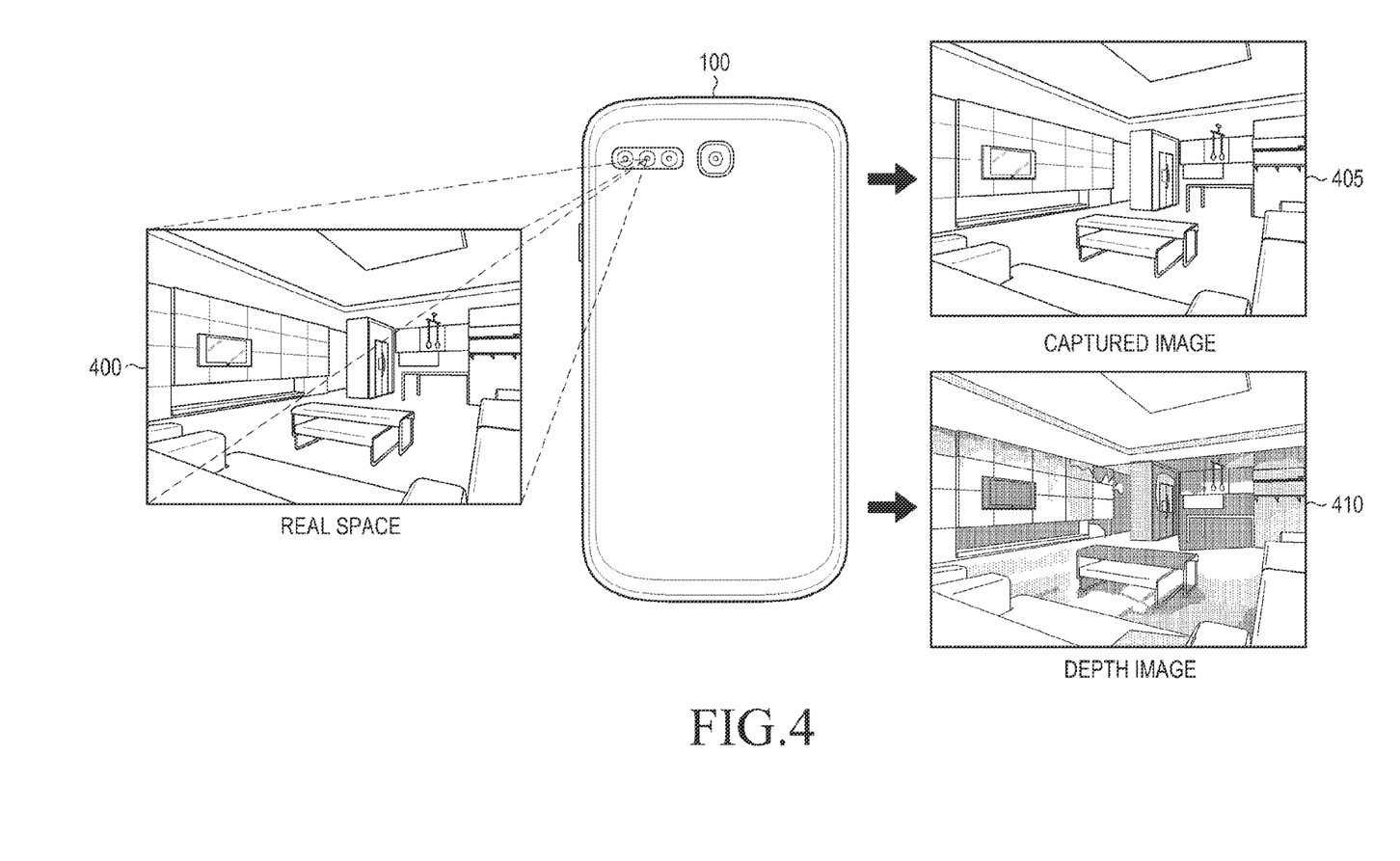
FIG. 4 illustrates a captured image and a depth image, both of which are obtained by capturing a real space, according to an embodiment of the present invention.

Depth information will now be briefly described in connection with FIG. 4. Referring to FIG. 4, when the second image input unit 152 placed on the rear of the mobile terminal 100 captures an actual space ahead, a typical camera module equipped with a common image sensor outputs a colorful image 405. In this case, the mobile terminal 100 may use a depth sensor to capture a depth image in terms of multiple objects located in the actual space. The depth sensor may be incorporated with or separated from the second image input unit 152. The depth sensor outputs a depth image 410 representing a sense of perspective for respective objects in the actual space. The depth image is used to create respective depth information of objects.

Figure 5A:
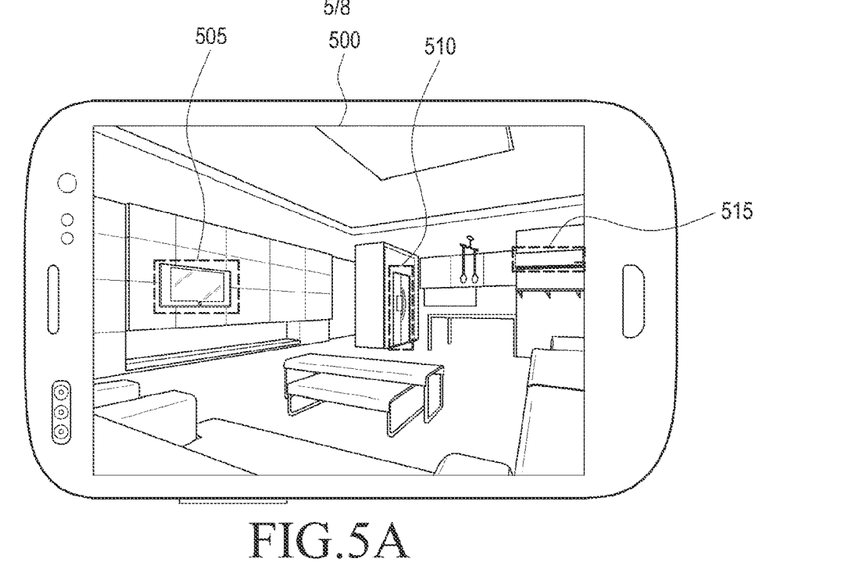
FIGS. 5A and 5B illustrate screens that display selectable objects in an image having multiple objects, according to an embodiment of the present invention.

As shown in FIG. 4, where many physical objects exist in an actual space 400, the mobile terminal 100 recognizes the objects from the captured image 405 based on an image recognition algorithm. FIG. 5A illustrates a screen of an image in which multiple objects 505, 510, and 515 are recognized through an image recognition process. The mobile terminal 100 may use one or more indicators to allow the user to identify the recognized objects.

Figure 5B:
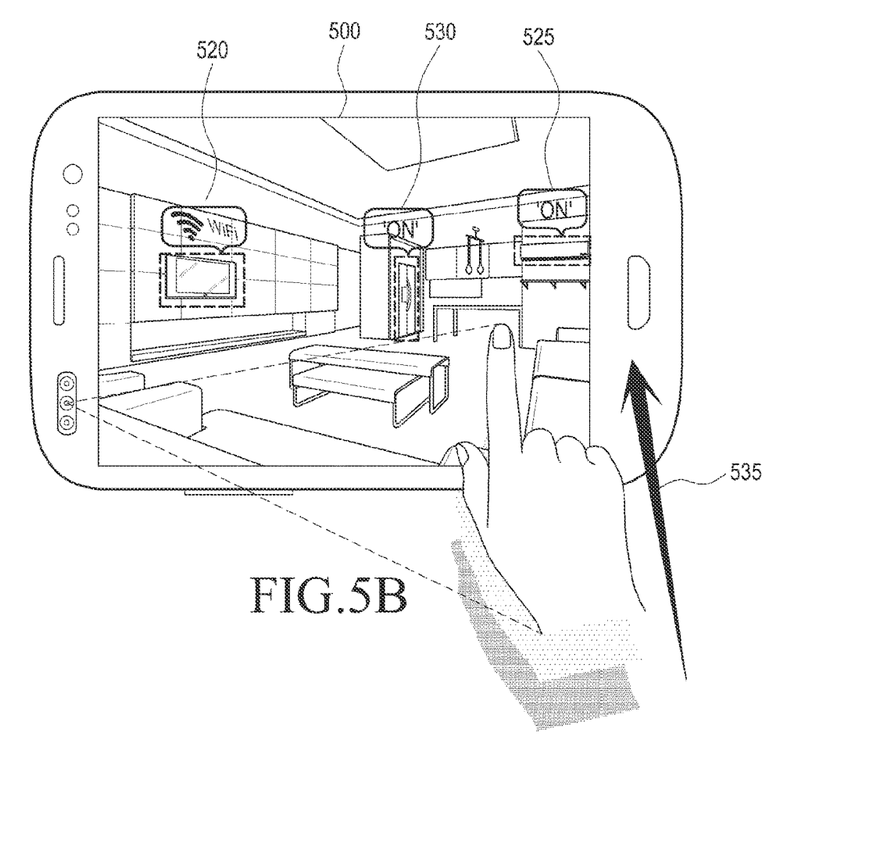

After completing recognition of multiple objects, the mobile terminal 100 may search for respective further information about the objects and match and display searched further information 520, 525, and 530 with respective objects, as shown in FIG. 5B. FIG. 5A illustrates when recognized objects are a television 505, a refrigerator 510, and a air conditioner 515, and FIG. 5B illustrates when pieces of further information 520, 525 and 530 of the television 505, the refrigerator 510, and the air conditioner 515, respectively are matched and displayed in an image of a real space. As such, in embodiments of the present invention, Augmented Reality (AR) information is displayed in an overlapping form, taking into account respective positions of the physical objects.

As shown in FIG. 5B, when the user's finger moves toward the touch screen, one of the multiple objects 505, 510, and 515 is selected.

Figure 6A:
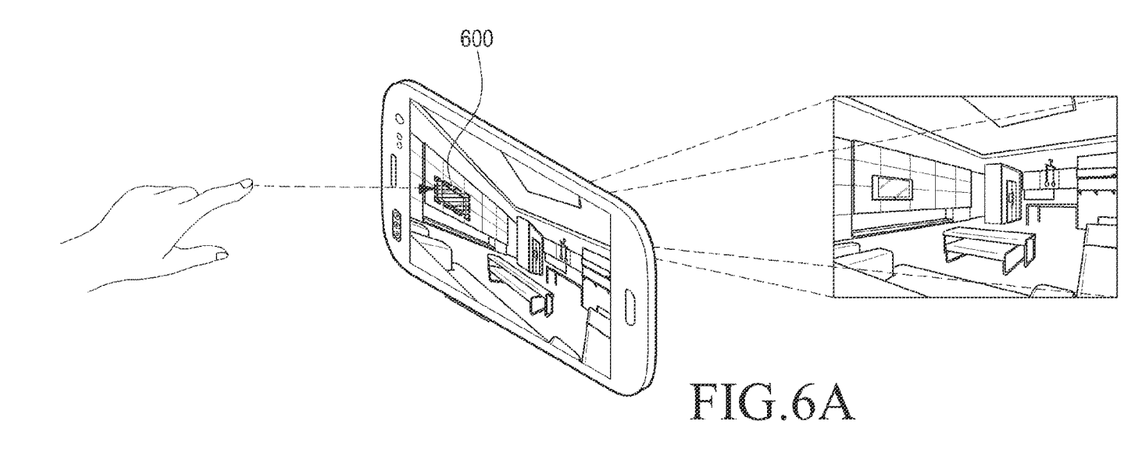
FIGS. 6A and 6B illustrate an occasion where a selectable object is changed within an image having multiple objects as a user input means approaches, according to an embodiment of the present invention.
Figure 6B:
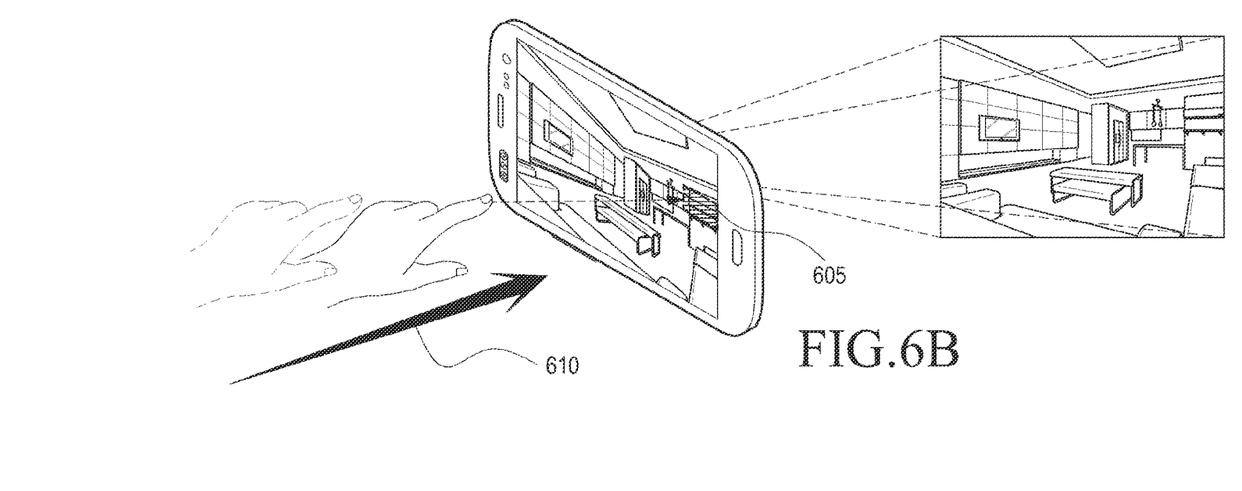

FIGS. 6A and 6B illustrate when a selectable object is changed within an image having multiple objects as a user input means approaches, according to an embodiment of the present invention. In the embodiment, the multiple objects have respective depth information, and depth values are assumed to increase in an order of a television, an air conditioner, and a refrigerator.

FIG. 6A shows a state of a touch screen before the user input means approaches. In this embodiment where a distance between the user input means and the mobile terminal, i.e., the touch screen is farther than a threshold, an object with the shallowest depth 600, e.g., the television is selectable. FIG. 6B shows a state of a touch screen as the user input means approaches thereto. As the user input means moves toward a touch screen 610, a selectable object, which was once an object with the shallowest depth, e.g., the television, as shown in FIG. 6A is changed to another object with relatively deeper depth, e.g., the air conditioner. When the user input means moves closer to the touch screen 610, an object with the deepest depth, e.g., the refrigerator may become selectable.

Figure 7:
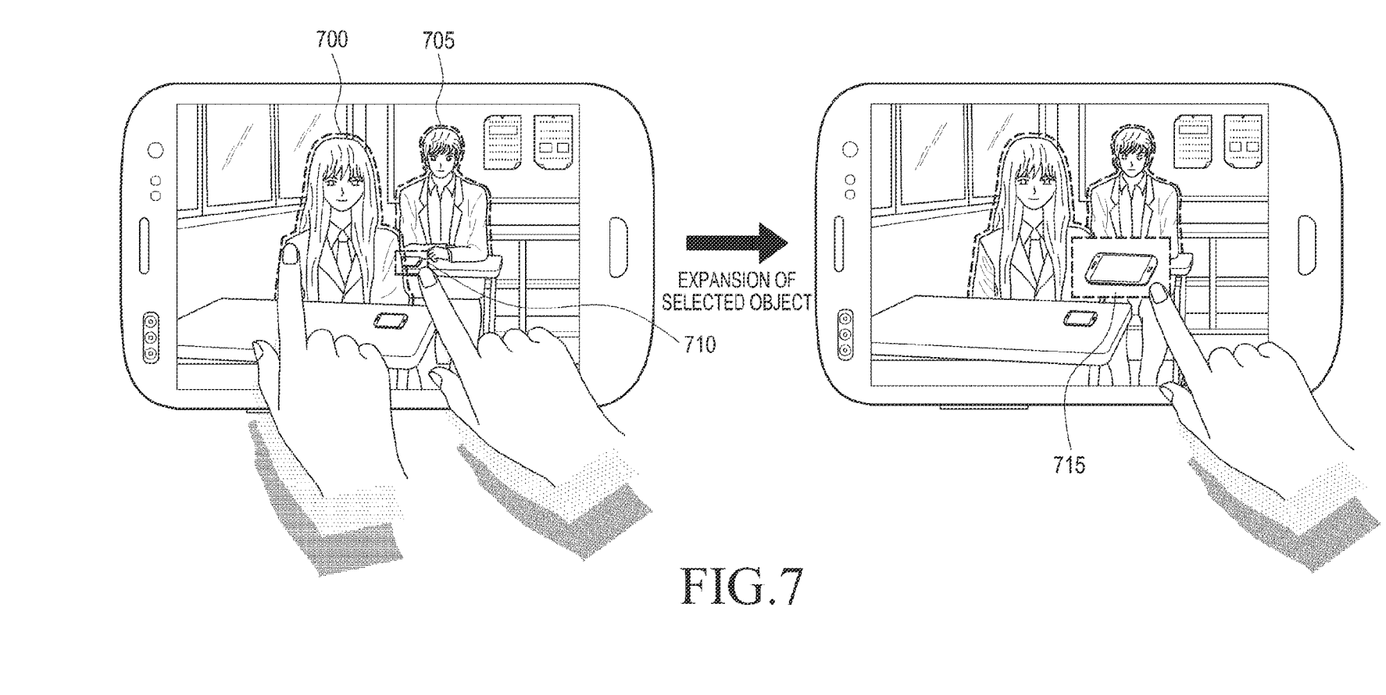
FIG. 7 illustrates screens in terms of a zoom-in function for a selected object, according to an embodiment of the present invention.

FIG. 7 illustrates screens in terms of a zoom-in function for a selected object, according to an embodiment of the present invention. Referring to FIG. 7, even if multiple objects 700, 705, and 710 are displayed to partly overlap each other or a tiny object smaller than a finger is displayed in a touch screen, such objects may be selected sequentially based on a distance between the user input means and the touch screen, thus guaranteeing easy and exact selection. A part of a partly hidden object 710 may have a virtual rectangular figure by estimating the hidden part taking into account the dimensions of revealed part of the object. Thus, even if the revealed part of the object 710 is tiny, a selectable object may fall on the virtual rectangular figure as the user input means approaches and thus selection accuracy increases.

As such, and as the user input means moves along the depth direction, a selectable object falls on the multiple objects sequentially from the first object 700 to the second object 705 to the third object 710, and the selectable object is identified by an indicator. When the third object 710 has the indicator meaning that the third object 710 is selectable, and the user makes a selecting gesture or makes a touch input, the third object 710 may be expanded 715 for better viewing. In addition, any other user interfacing functions, such as reduction and information searches for the selected object may be provided in other embodiments. For example, if a selectable object falls on a television, selecting the television generates a control command e.g., to turn on/off the television. It is illustrated that any of indoor objects partly hidden from each other may be selected in FIG. 7, but the method of selecting an object by moving the user input means along the depth direction may also be applied in selecting any of hidden buildings, provided an AR service for outdoor buildings is used.

Figure 8:
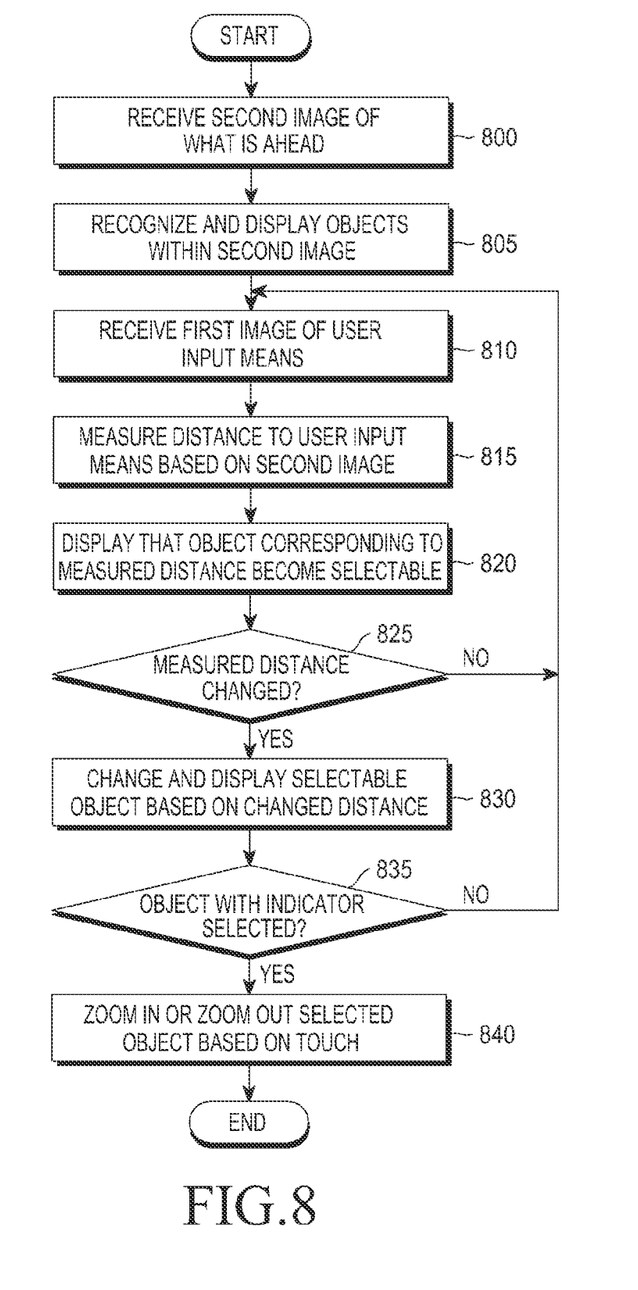
FIG. 8 illustrates a process of selecting an object based on movement of a user input means, according to an embodiment of the present invention.

FIG. 8 illustrates operations of a mobile terminal, according to an embodiment of the present invention.

Referring to FIG. 8, upon reception of a second image obtained by capturing what is ahead of the second image input unit 152 in step 800, the mobile terminal 100 recognizes and displays multiple objects within the second image in step 805. Upon reception of a first image obtained by capturing a user input means from the first image input unit 151 of the mobile terminal 100 in step 810, the mobile terminal 100 measures a distance to the user input means based on the first image, in step 815. In step 820, the mobile terminal 100 displays that an object corresponding to the measured distance is selectable. In step 825, the mobile terminal 100 determines whether the measured distance has changed. If the measured distance has not changed, the process returns to step 810 to continue to capture the user input means. If the measured distance has been changed, the mobile terminal 100 changes and represents a selectable object with an indicator based on the changed distance, in step 830. If the selectable object represented with the indicator is not chosen, the process returns to step 810. Otherwise, if the selectable object represented with the indicator is chosen in step 835, the mobile terminal 100 zooms in or zooms out the object based on a touch input in step 840.

According to the present invention, a method for enabling easy interaction for an object in a real image is provided, thus to allow a user to intuitively manipulate the object. According to the embodiments of the present invention, a distance to a user input means is recognized using a depth sensor, and objects are easily selected based on the distance even if they are displayed to partly overlap each other in an image.

It will be appreciated that the embodiments of the present invention may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement the embodiments of the present invention.

The apparatus for controlling a user interface may receive the program from a program provider wired/wirelessly connected thereto, and store the program. The program provider may include a memory for storing programs having instructions to perform the embodiments of the present invention, information necessary for the embodiments of the present invention, etc., a communication unit for wired/wirelessly communicating with the mobile communication terminal 200, and a controller for sending the program to the mobile communication terminal 200 on request or automatically.

Embodiments have thus been described, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. An electronic device for controlling a user interface to select an object included in an image, the electronic device comprising:
   a first sensor configured to detect first depth information of a user input;
   a second sensor configured to detect second depth information of partly overlapping multiple objects;
   a camera, located adjacent to the second sensor, configured to capture an image of the multiple objects;

a display including a touch screen, configured to display the captured image in which the multiple objects are displayed to partly overlap each other; and a processor configured to:

select, when the first depth information corresponding to a first distance between the user input and the electronic device is detected using the first sensor, a first image portion of a first object spaced a part from the electronic device in a shallowest depth from among the multiple objects displayed to partly overlap each other detected by the second sensor;

select the first image portion of the first object in the captured image in response to t he selecting of the first image portion of the first object;

select, when the first depth information corresponding to a second distance between the user input and the electronic device is detected using the first sensor, a second image portion of a second object spaced apart from the electronic device in a depth deeper than the shallowest depth from among the multiple objects displayed to partly overlap each other detected by the second sensor, and select the second image portion of the second object in the captured image in response to the selecting of the second image portion of the second object, wherein the first distance is longer than a predetermined distance and the second distance is shorter than the predetermined distance.

2. The electronic device of claim 1, wherein the processor controls to display at least one of the first object and the second object sequentially among the multiple objects displayed to partly overlap each other from an object with shallower depth to an object with deeper depth.

3. The electronic device of claim 2, wherein the processor determines a sequence of the at least one of the first object and the second object based on the first and second depth information.

4. The electronic device of claim 1, wherein the processor is further configured to control the display to display the first object and the second object among the multiple objects displayed to partly overlap each other by using an indicator.

5. The electronic device of claim 1, wherein the processor is further configured to control the display to display the first object and the second object to be expanded or reduced based on a touch input of the user input on the touch screen.

6. The electronic device of claim 1, wherein the display displays the multiple objects displayed to partly overlap each other within the captured image with respective additional information related to the multiple objects displayed to partly overlap each other.

7. A method for selecting an object included in an image in an electronic device for controlling a user interface, the method comprising:

detecting first depth information of a user input by using a first sensor and second depth information of partly overlapping multiple objects by using a second sensor;

capturing an image of the multiple objects;

displaying the captured image in which the multiple objects are displayed to partly overlap each other;

selecting, when the first depth information corresponding to a first distance between the user input and the electronic device is detected using the first sensor, a first image portion of a first object spaced apart from the electronic device in a shallowest depth from among the multiple objects displayed to partly overlap each other detected by the second sensor;

selecting the first image portion of the first object in the captured image in response to selecting the first image portion of the first object;

selecting, when the first depth information corresponding to a second distance between the user input and the electronic device is detected using the first sensor, a second image portion of a second object spaced apart from the electronic device in a depth deeper than the shallowest depth from among the multiple objects displayed to partly overlap each other detected by the second sensor; and selecting the second image portion in the captured image in response to selecting the second image portion of the second object, wherein the first distance is longer than a predetermined distance and the second distance is shorter than the predetermined distance.

8. The method of claim 7, further comprising:

displaying the first object and the second object sequentially from an object with shallow depth to an object with deeper depth among the multiple objects displayed to partly overlap each other based on the second depth information.

9. The method of claim 8, further comprising:

determining a sequence of at least one of the first object and the second object based on first and second depth information of the multiple objects displayed to partly overlap each other.

10. The method of claim 7, further comprising:

displaying the first object and the second object with an indicator, among the multiple objects displayed to partly overlap each other.

11. The method of claim 7, further comprising:

displaying the multiple objects displayed to partly overlap each other with respective additional information related to the multiple objects displayed to partly overlap each other.

12. The method of claim 7, further comprising:

displaying the first object and the second object to be expanded or reduced according to a touch input of the user input.

* * * * *